Patented Oct. 30, 1923.

1,472,353

UNITED STATES PATENT OFFICE.

JAMES GIBBON BYROM, OF HEATON CHAPEL, ENGLAND, ASSIGNOR TO RICHARD ATTWATER, OF LANCASTER, ENGLAND.

MANUFACTURE OF FORMALDEHYDE CONDENSATION PRODUCTS OF PHENOLS.

No Drawing.     Application filed February 27, 1923. Serial No. 621,677.

*To all whom it may concern:*

Be it known that I, JAMES GIBBON BYROM, a British subject, residing at Heaton Chapel, county of Lancaster, England, have invented certain new and useful Improvements in the Manufacture of Formaldehyde Condensation Products of Phenols, of which the following is a specification.

This invention relates to improvements in the preparation of phenol formaldehyde condensation products.

It consists in the use of sodium thiosulphate $Na_2S_2O_3 5H_2O$ (commercially known as sodium hyposulphite) or other neutral salt of thiosulphuric acid $H_2S_2O_3$ as the catalytic or condensing agent.

By using sodium thiosulphate as the catalyzer, light coloured products are obtained even when using commercial cresylic acid or carbolic acid at a temperature ranging from 90° C. to 115° C. with a minimum amount of formaldehyde viz:—40% to 60% of 40% formaldehyde by weight of cresylic acid.

The process is fairly rapid after the temperature of 90° C. to 100° C. is obtained, the reaction taking place gradually and is easily controlled, until the desired products are obtained; which takes place in a few hours.

The products formed are stable, not being affected by light or air; they are light coloured soluble in alcohol, and can be used as varnishes for a variety of purposes. The products without dilution with solvents are easily incorporated with filling materials, and can be hardened by heating under pressure, or without pressure, to a temperature varying from about 140° C. to 200° C. producing compounds which are very hard, being insoluble in almost all solvents, such as water, oil, benzine, dilute acids, and alkalies. These hardened products are very suitable for electrical insulation and other purposes.

The invention is not confined to any particular proportion of sodium thiosulphate, but it is found to be advantageous to have an excess of the amount required to bring about the reaction; the excess may be used over again for treating further quantities of the phenols.

The process may be carried out in any suitable vessel such as for example an iron vessel preferably enamelled, of a conical shape fitted with outlet pipe having a valve at bottom, heated by direct heat or steam jacketed, or fitted with a steam coil, the vessel is fitted with a cover preferably water jacketed to prevent escape of the fumes, and also any loss taking place during the preparation.

The following example illustrates the manner of carrying out the process:—

To 112 lbs. of cresylic acid (98% purity) free from sulphur compounds are added 72 pounds of sodium thiosulphate and 16 pounds of 40% formaldehyde. The mixture is heated to about 115° C. and maintained at this temperature for a period of about two hours, there being added at intervals of half an hour 16 pounds of 40% formaldehyde until the amount of 64 pounds of formaldehyde has been added. During the last half hour or thereabouts the temperature is lowered to about 110° C. and maintained at this temperature until the reaction is complete which is ascertained by taking samples and cooling in the usual manner, until the desired consistency is obtained.

It is important during the preparation to avoid having any excess of formaldehyde over the amounts previously stated, as products are liable to be formed which are insoluble in alcohol, and too hard for practical application. The condensation products prepared as thus described can be made to a varying degree of consistency, from a clear fluid product up to a plastic, or a solid state, according to the duration of treatment.

The finished product is separated from the aqueous salt solution by opening the valve of outlet pipe at the bottom of the vessel, and running off into another vessel for subsequent use, the valve being closed when the condensation products commence to run through. The contents of the vessel is then reduced to any desired strength with alcohol, or after cooling, run off without diluting into other vessels for subsequent treatment.

By a similar method of procedure, pure phenol, or the liquid carbolic acid, or a mixture of carbolic acid and cresylic acid, may be employed.

What I claim as my invention and desire to protect by Letters Patent is:—

1. In the preparation of phenol formaldehyde condensation products the use of a neutral salt of thiosulphuric acid as catalytic or condensing agent.

2. In the preparation of phenol formaldehyde condensation products the use of sodium thiosulphate (commercially known as sodium hyposulphite) as catalytic or condensing agent.

In testimony whereof I have hereunto set my hand in presence of two subscribing witnesses, this 13th day of February 1923.

JAMES GIBBON BYROM.

Witnesses:
J. Owden O'Brien,
George H. O'Brien.